(12) United States Patent
Tahara

(10) Patent No.: US 10,571,306 B2
(45) Date of Patent: Feb. 25, 2020

(54) ELECTROMAGNETIC INDUCTION TYPE POSITION DETECTOR

(71) Applicant: Mitutoyo Corporation, Kawasaki, Kanagawa (JP)

(72) Inventor: Tomohiro Tahara, Tokyo (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 16/178,012

(22) Filed: Nov. 1, 2018

(65) Prior Publication Data
US 2019/0170538 A1    Jun. 6, 2019

(30) Foreign Application Priority Data

Dec. 1, 2017  (JP) .................................. 2017-231577

(51) Int. Cl.
*G01D 5/20* (2006.01)

(52) U.S. Cl.
CPC ........... *G01D 5/2086* (2013.01); *G01D 5/206* (2013.01)

(58) Field of Classification Search
None
See application file for complete search history.

(56) References Cited

U.S. PATENT DOCUMENTS

| 5,804,963 | A | * | 9/1998 | Meyer | ................... | G01D 5/202 |
| | | | | | | 324/207.17 |
| 6,329,813 | B1 | | 12/2001 | Andermo | | |
| 6,400,138 | B1 | | 6/2002 | Andermo | | |
| 7,015,687 | B2 | * | 3/2006 | Meyer | ................... | G01D 5/2053 |
| | | | | | | 324/207.17 |
| 7,652,469 | B2 | * | 1/2010 | Meyer | ................... | G01D 5/202 |
| | | | | | | 324/207.15 |
| 2002/0097043 | A1 | * | 7/2002 | Sasaki | ................... | G01B 7/003 |
| | | | | | | 324/207.17 |
| 2013/0033257 | A1 | * | 2/2013 | Sasaki | ................... | G01D 5/2086 |
| | | | | | | 324/207.17 |
| 2013/0226510 | A1 | * | 8/2013 | Ishii | ................... | G01D 5/2086 |
| | | | | | | 702/150 |

FOREIGN PATENT DOCUMENTS

| JP | 2000-180209 | 6/2000 |
| JP | 2013-079915 | 5/2013 |

* cited by examiner

*Primary Examiner* — Paresh Patel
(74) *Attorney, Agent, or Firm* — Rankin, Hill & Clark LLP

(57) ABSTRACT

The electromagnetic induction type position detector includes a scale having a plurality of gradation coils, a head having a transmission unit and a reception unit, and a control unit. Each of the plurality of graduation coils includes a transmission graduation arranged with a pitch L1, a reception graduation arranged with a pitch L0 different from the pitch L1, and a connection unit. The transmission unit includes three transmission coil groups that are constituted by pluralities of transmission coils, each being arranged with a pitch L1, and that are arranged such that adjacent transmission coil groups have a phase difference. The reception unit includes three reception coil groups that are constituted by pluralities of reception coils, each being arranged with a pitch L0, and that are arranged such that adjacent reception coil groups have a phase difference identical to the phase difference of the three transmission coil groups.

5 Claims, 9 Drawing Sheets

ELECTROMAGNETIC INDUCTION TYPE POSITION DETECTOR

TECHNICAL FIELD

The present invention relates to an electromagnetic induction type position detector.

BACKGROUND ART

In the related art, an electromagnetic induction type position detector is known that includes a plate-shaped graduation substrate having graduation coils arranged with a predetermined pitch along a predetermined direction and a detector having a transmission coil and a reception coil that are provided to face the graduation coil. The electromagnetic induction type position detector is used, for example, for calipers, indicators, linear scales, micrometers and the like. By driving (exciting) the transmission coil, the electromagnetic induction type position detector detects, via the graduation coil, a sine wave signal (signal) having the same period as the pitch of the graduation coil with the reception coil. The electromagnetic induction type position detector calculates, from the detected signal, the position of the detector in a predetermined direction with respect to the scale substrate.

For example, in Patent Document 1, an electromagnetic induction type encoder (electromagnetic induction type position detector) includes a scale (graduation coil) having a scale coil (graduation coil) and a head (detector) having a transmission coil and a reception coil. In such an electromagnetic induction type encoder, a scale coil, a transmission coil, and a reception coil are constituted by using a multilayer substrate formed by stacking a plurality of substrates.

Here, an incremental method (INC method) and an absolute method (ABS method) are known as methods for calculating the position of the head in a predetermined direction with respect to the scale by using the electromagnetic induction type encoder.

The INC method is a method in which a relative position is calculated by continuously detecting incremental graduation coils (INC graduation coils) of a scale that are arranged at a constant pitch, and counting up or counting down the number of coils in the INC graduation coils that pass. However, the INC method has a problem in that the absolute position of the head in a predetermined direction with respect to the scale cannot he acquired.

In contrast, the ABS method is a method in which an absolute position is detected by detecting, with the head at an appropriate timing, absolute graduation coils (ABS graduation coils) that are randomly arranged on the scale, and analyzing the detected signals. In the ABS method, it is possible to acquire the absolute position of the head in a predetermined direction with respect to the scale. However, the ABS method has a problem in that, although the absolute position can be acquired, it is only possible to acquire position information with a lower resolution than that of the INC method.

To address such a problem, Patent Document 2, for example, proposes an encoder (electromagnetic induction type position detector) that uses the calculation methods of both the INC method and the ABS method. The encoder uses a double-track type scale provided with an incremental track (INC track) that includes an INC pattern (INC graduation coil) and an absolute track (ABS track) that includes an ABS pattern (ABS graduation coil). Then, the INC pattern and the ABS pattern are detected by a detector head (detector), and the position information is calculated based on each pattern.

This encoder compares the relative position calculated from the INC pattern with the absolute position calculated from the ABS pattern. Next, the encoder combines the relative position and the absolute position to calculate the position of the head in the predetermined direction with respect to the scale, verify the detection error by comparing the relative position and the absolute position, and correct the relative position by using the absolute position.

In a case where it is desired to calculate a higher resolution position of the head in the predetermined direction with respect to the scale by using the INC method and the ABS method, it is conceivable that the electromagnetic induction type encoder could configure a shorter period of the signal to be detected. In particular, in the electromagnetic induction type encoder, by configuring the pitch of the scale coil, the transmission coil, and the reception coil to be small, for example, the period of the signal can be configured to be short.

CITATION LIST

Patent Literature

Patent Document 1: JP 2000-180209 A
Patent Document 2: JP 2013-79915 A

SUMMARY OF INVENTION

Technical Problem

However, in such an electromagnetic induction type encoder, in a case that the pitch of the scale coil, the transmission coil, and the reception coil are configured to be small, the design rules of the scale and the head become problematic.

Here, the design rules are physical restrictions in manufacturing due to, for example, the size of the substrates on which the scale coil, the transmission coil, and the reception coil are formed.

That is, in a case that the pitch of the scale coil, the transmission coil, and the reception coil are formed to be small, for example, the pitch of the through-holes or the like that connect the substrates of the multilayer substrate is also reduced, and a plurality of through-holes or the like are formed in contact with each other or overlapping with each other. In the case that a plurality of through-holes or the like are formed in contact with each other or overlapping with each other, there is a problem in which the head cannot detect a normal signal.

An object of the invention is to provide an electromagnetic induction type position detector capable of mitigating design rule restrictions, while detecting an absolute position signal, and causing the resolution of the position of a detector, in a predetermined direction with respect to a graduation substrate, to be higher.

Solution to Problem

The electromagnetic induction type position detector of the invention relates to an electromagnetic induction type position detector including: a graduation substrate that is plate-shaped and includes a plurality of graduation coils arranged along a predetermined direction; a detector including a transmission unit and a reception unit that are provided to face the plurality of graduation coils; and a control unit configured to calculate, by driving the transmission unit, a position of the detector in the predetermined direction with respect to the graduation substrate based on a change of a signal to be detected by the reception unit via the plurality of graduation coils; wherein each of the plurality of graduation coils includes: a transmission graduation, arranged with a pitch that is predetermined along the predetermined direction that faces the transmission unit, a reception graduation, arranged with a pitch different from the pitch of the transmission graduation along the predetermined direction, that faces the reception unit, and a connection unit for connecting the transmission graduation and the reception graduation; the transmission unit includes: a plurality of transmission coil groups arranged along the predetermined direction such that adjacent transmission coil groups have a phase difference that is predetermined, and a plurality of transmission coils, arranged with a pitch which is an integral multiple of the pitch of the transmission graduation along the predetermined direction, that constitute each of the plurality of transmission coil groups; the reception unit includes: a plurality of reception coil groups arranged along the predetermined direction such that adjacent reception coil groups have a phase difference identical to the phase difference of the plurality of transmission coil groups, and a plurality of reception coils, arranged with a pitch which is an integral multiple of the pitch of the reception graduation along the predetermined direction, that constitute each of the plurality of reception coil groups; and the control unit is configured to: independently drive the plurality of transmission coil groups in order, and generate, based on a plurality of signals detected by the plurality of reception coil groups, each detecting a signal for each of the plurality of transmission coil groups in an order of driving the plurality of transmission coil groups an absolute position signal to calculate an absolute position of the detector with respect to the graduation substrate and a relative position signal to calculate a relative position of the detector with respect to the graduation substrate, and calculate, based on the absolute position signal and the relative position signal, a position of the detector in the predetermined direction with respect to the graduation substrate.

According to the invention as described above, in an electromagnetic induction type position detector, three transmission coil groups may be arranged such that adjacent transmission coil groups have a predetermined phase difference, and three reception coil groups may be arranged such that adjacent reception coil groups have a predetermined phase difference, for example. With this arrangement, in a case that the three transmission coil groups are independently driven in order, a total of nine signals can be detected by the three reception coil groups, each detecting a signal for each of the three transmission coil groups in the order of driving the three transmission coil groups.

Here, the nine signals are signals obtained by combining an absolute position signal and a relative position signal. Accordingly, by analyzing the nine detection signals with a predetermined operation, the electromagnetic induction type position detector can generate the absolute position signal and the relative position signal. The control unit can calculate, based on the generated absolute position signal and the relative position signal, the position of the detector in the predetermined direction with respect to the graduation substrate.

In addition, the relative position signal generated from the nine detections signals is a higher resolution relative position signal than the relative position signals detected by an electromagnetic induction type position detector that includes one transmission coil group and one reception coil group.

That is, the graduation coil of the electromagnetic induction type position detector is provided with a transmission graduation having a pitch that is predetermined and a reception graduation having a pitch different from the pitch of the transmission graduation, and the detector is constituted by a plurality of transmission coil groups arranged such that adjacent transmission coil groups have a predetermined phase difference, a plurality of reception coil groups arranged such that adjacent reception coil groups have a predetermined phase difference, a plurality of transmission coils arranged with a pitch that is an integral multiple of the pitch of the transmission graduation, and a plurality of reception coils arranged with a pitch that is an integral multiple of the pitch of the reception graduation. This configuration allows a relative position signal having a period shorter than the pitches of the transmission coil and the reception coil to be generated.

The electromagnetic induction type position detector can generate a high resolution relative position signal without changing the pitches of the transmission coil and the reception coil.

Accordingly, since the electromagnetic induction type position detector can detect the absolute position signal and can detect the high resolution relative position signal without configuring the pitches of the graduation coil, the transmission coil, and the reception coil to be smaller, it is possible to mitigate design rule restrictions, detect an absolute position signal, and cause the resolution of the position of the detector, in a predetermined direction with respect to a graduation substrate, to be higher.

At this time, it is preferable that the plurality of transmission coils are arranged along the predetermined direction with a pitch identical to the pitch of the transmission graduation, and the plurality of reception coils are arranged along the predetermined direction with a pitch identical to the pitch of the reception graduation.

Here, although the electromagnetic induction type position detector uses the reception coil to detect, via the graduation coil (the transmission graduation, the reception graduation, and the connection unit), a signal having the same period as the pitch of the graduation coil by driving the transmission coil, in a case, for example, that the transmission coil is arranged with a pitch that is three times the pitch of the transmission graduation and the reception coil is arranged with a pitch that is three times the pitch of the reception graduation, there is a problem in which the detection efficiency of the electromagnetic induction type position detector may decrease.

In particular, since the transmission coils and the receptions coils are arranged such that coils in which the direction of the magnetic field is positive and coils in which the direction is negative alternate along the predetermined direction, in a case, for example, that the transmission coils are arranged with a pitch three times the pitch of the transmission graduation and the reception coils are arranged with a pitch three times the pitch of the reception graduation, three graduation coils (the transmission graduation, the reception graduation, and the connecting portion) are arranged so as to face two coils including a positive coil and a negative coil.

For example, one of the three graduation coils faces a positive coil and another graduation coil faces a negative coil, but the central graduation coil faces both the positive coil and the negative coil. For this reason, the central graduation coil is influenced by both the positive coil and the negative coil, and the signals cancel each other out so that a signal cannot be detected.

Accordingly, in a case that the transmission coil is arranged with a pitch that is an integral multiple of the pitch of the transmission graduation and the reception coil is arranged with a pitch that is an integral multiple of the pitch of the reception graduation, the detection efficiency of the electromagnetic induction type position detector may decrease.

According to the invention, however, since a plurality of transmission coils are arranged with a pitch identical to the pitch of the transmission graduation and a plurality of reception coils are arranged with a pitch identical to the pitch of the reception graduation, it is possible to prevent the occurrence of graduation coils with reduced detection efficiencies due to signal cancellation. Accordingly, in comparison with a case, for example, in which transmission coils are arranged with a pitch three times the pitch of the transmission graduation and the reception coils are arranged with a pitch three times the pitch of the reception graduation, the electromagnetic induction type position detector can prevent a decrease in detection efficiency.

At this time, it is preferable that the plurality of transmission coils are arranged along the predetermined direction with a pitch that is twice the pitch of the transmission graduation, and the plurality of reception coils are arranged along the predetermined direction with a pitch that is twice the pitch of the reception graduation.

According to such a configuration, by arranging the plurality of transmission coils with a pitch that is twice the pitch of the transmission graduation and the plurality of reception coils with a pitch that is twice the reception gradation, double the graduation coils are arranged to face the plurality of transmission coils and the plurality of reception coils in comparison with a case where the plurality of transmission coils are arranged with the same pitch as the pitch of the transmission graduation, and the plurality of reception coils are arranged with the same pitch as the pitch of the reception graduation. Accordingly, in comparison with an electromagnetic induction type position detector in which the plurality of transmission coils are arranged with the same pitch as the pitch of the transmission graduation and the plurality of transmission coils are arranged with the same pitch as the pitch of the reception graduation, the electromagnetic induction type detector can detect a signal having an approximately two times larger intensity. This allows a signal to be efficiently detected.

At this time, it is preferable that the control unit includes a driving unit configured to independently drive the plurality of transmission coil groups in order; a detector configured to detect a plurality of signals with the plurality of reception coil groups, each detecting a signal for each of the plurality of transmission coil groups in the order of driving the plurality of transmission coil groups; an absolute position signal generation unit configured to generate the absolute position signal to calculate, based on the plurality of signals, the absolute position of the detector with respect to the graduation substrate; a relative position signal generation unit configured to generate the relative position signal to calculate, based on the plurality of signals, the relative position of the detector with respect to the graduation substrate; and a calculation unit configured to calculate, based on the absolute position signal and the relative position signal, the position of the detector in the predetermined direction with respect to the graduation substrate.

According to such a configuration, in a case that three transmission coil groups are arranged such that adjacent transmission coil groups have a predetermined phase difference, and that three reception coil groups are arranged such that adjacent reception coil groups have a predetermined phase difference, for example, the control unit includes a driving unit configured to independently drive the three transmission coil groups in order, and a detection unit configured to detect nine signals with the three reception coil groups, each detecting a signal for each of the three transmission coil groups in the order of driving the three transmission coil groups.

Further, the control unit includes an absolute position signal generation unit configured to generate, with a predetermined operation, an absolute position signal from the nine signals detected by the detection unit, and a relative position signal generation unit configured to generate, with a predetermined operation, a relative position signal from the nine signals detected by the detection unit. These nine signals are signals obtained by combining an absolute position signal and a relative position signal. Accordingly, the absolute position signal generation unit can generate the absolute position signal by performing a predetermined operation on the nine signals, and the relative position signal can generate the relative position signal by performing a predetermined operation on the nine signals. In addition, the relative position signal generation unit can generate a relative position signal having a period smaller than the pitches of the transmission coil and the reception coil.

Accordingly, since the electromagnetic induction type position detector can detect the absolute position signal and can detect the high resolution relative position signal without configuring the pitches of the graduation coil, the transmission coil, and the reception coil to be smaller, it is possible to mitigate design rule restrictions, detect an absolute position signal, and cause the resolution of the position of the detector, in a predetermined direction with respect to a graduation substrate, to be higher.

The electromagnetic induction type encoder of the invention is an electromagnetic induction type encoder provided with the electromagnetic induction type position detector of the invention, the electromagnetic induction type encoder including a scale that is plate-shaped and includes the plurality of graduation coils arranged along a predetermined direction; and a head including the transmission unit and the reception unit that are provided to face the plurality of graduation coils, wherein the control unit is configured to calculate, based on the absolute position signal and the relative position signal, a position of the head in the predetermined direction with respect to the scale.

According to such a configuration, since the electromagnetic induction type encoder is provided with the electromagnetic induction type position detector of the invention, it is possible to mitigate the design rule restrictions, detect the absolute position signal, and cause the resolution of the position of the detector, in the predetermined direction with respect to the graduation substrate, to be higher.

DESCRIPTION OF EMBODIMENTS

First Embodiment

A first embodiment of the invention will be described hereinafter based on the drawings.

Figure 1:
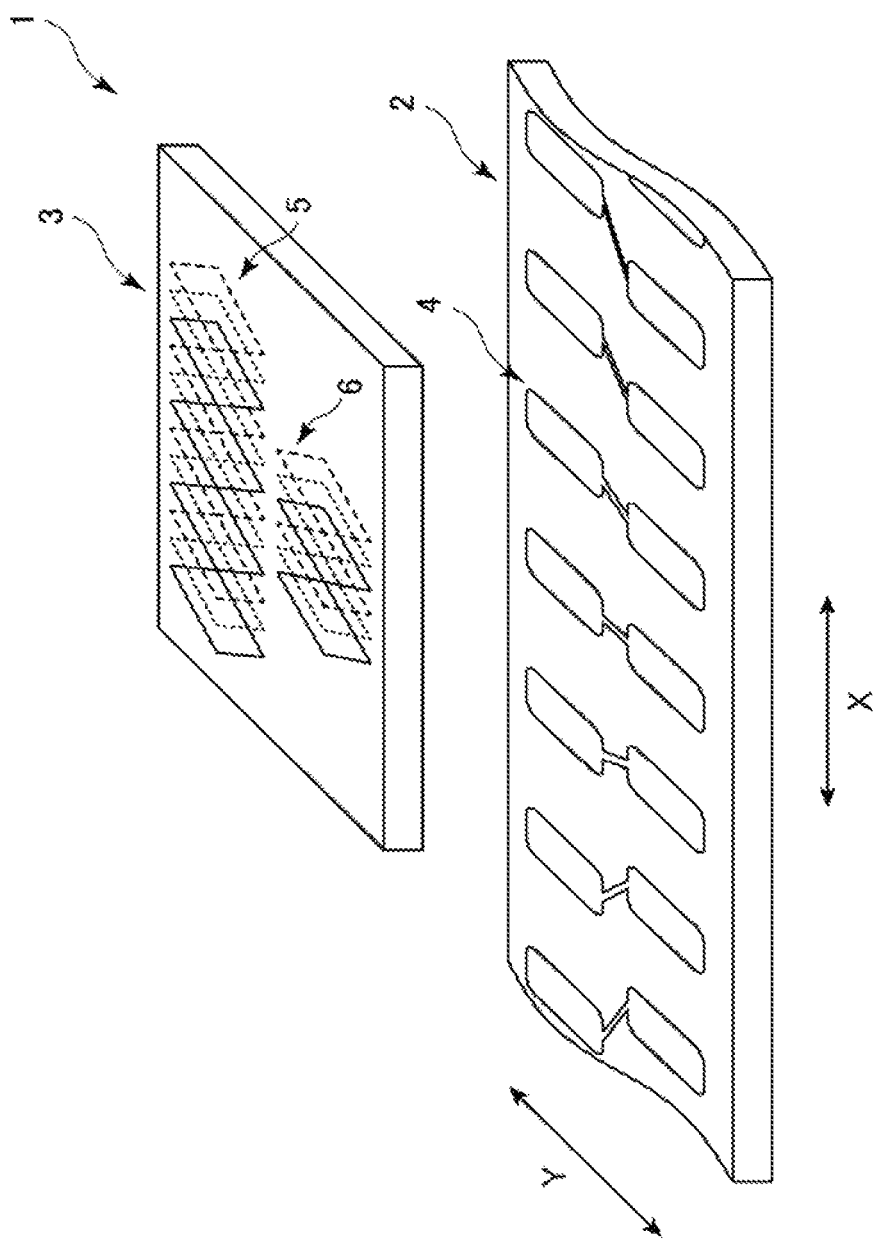
FIG. 1 is a perspective view illustrating an electromagnetic induction type position detector according to a first embodiment of the invention.

FIG. 1 is a perspective view illustrating an electromagnetic induction type position detector according to a first embodiment of the invention.

The electromagnetic induction type position detector 1 is used by an electromagnetic induction type linear encoder, and is provided inside an electromagnetic induction type linear encoder. As illustrated in FIG. 1, the electromagnetic induction type position detector 1 includes a scale 2, which is a plate-shaped graduation substrate, and a head 3, which is a detector provided to face the scale 2.

It should be noted that in the following description and in the drawings, there are cases in which the movement (measurement) direction (predetermined direction) of the head 3, which is the longitudinal direction of the scale 2, is denoted as the X direction, and the width direction of the scale 2 orthogonal to the X direction is denoted as the Y direction, The scale 2 includes a plurality of graduation coils 4 arranged along the X direction (predetermined direction). The head 3 includes a transmission unit 5 and a reception unit 6 that face the graduation coils 4. It should be noted that, in FIG. 1, for convenience of description, the head 3 is illustrated as a head being formed of a transparent plate-shaped member.

By moving the scale 2 and the head 3 relatively along the X direction and driving the transmission unit 5, the electromagnetic induction type position detector 1 calculates the position of the head 3 in the X direction with respect to the scale 2 based on the change of the signal detected by the reception unit 6 via the graduation coil 4.

Figure 2:
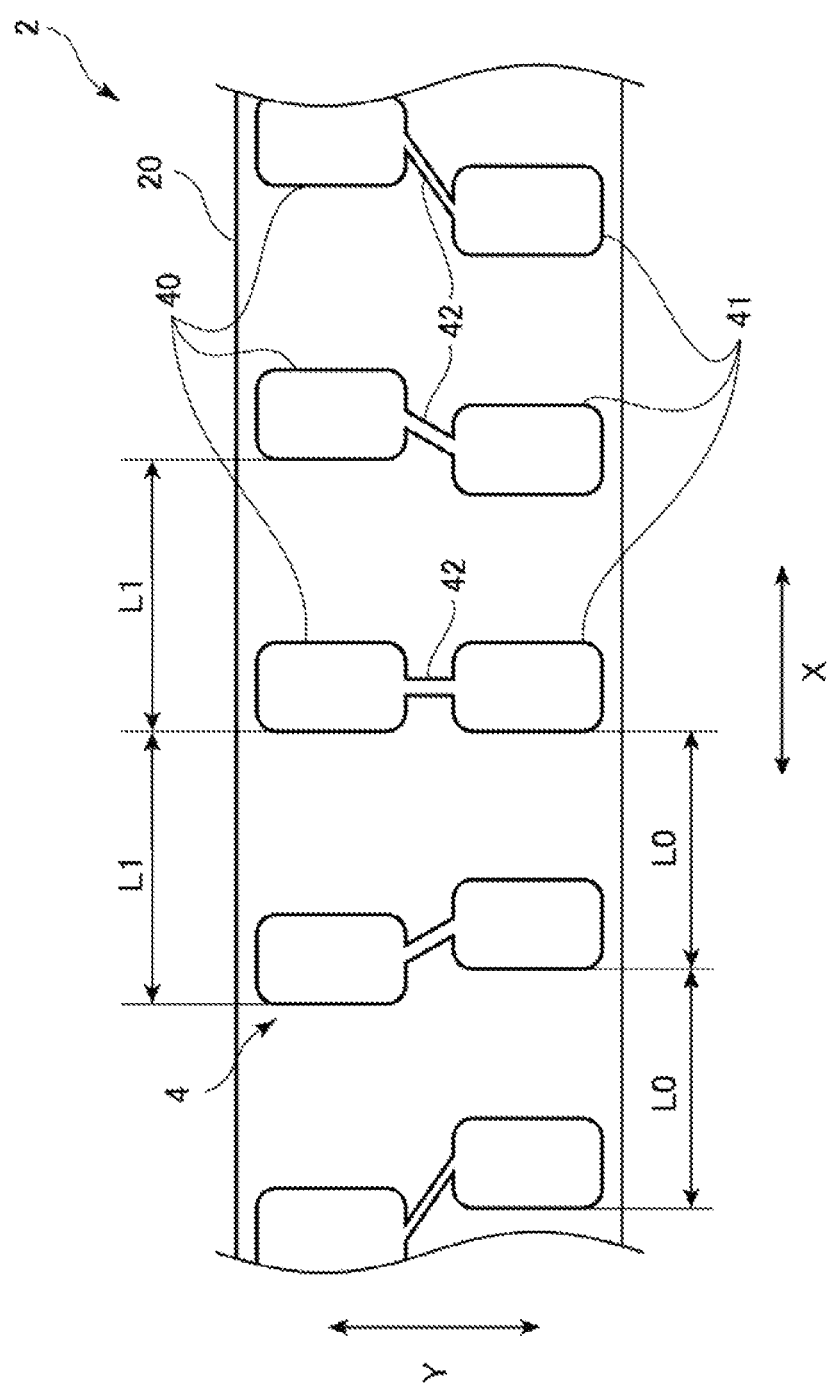
FIG. 2 is a top view illustrating a scale of the electromagnetic induction type position detector.

FIG. 2 is a top view illustrating a scale of the electromagnetic induction type position detector.

As illustrated in FIG. 2, the scale 2 is formed by an insulating substrate 20 made of an elongated glass epoxy resin. A plurality of graduation coils 4 are provided on one surface of an insulating substrate 20 that faces the head 3 along the X direction.

It should be noted that the insulating substrate 20 may be constituted by a material such as glass and silicon instead of glass epoxy resin.

The graduation coils 4 include a transmission graduation 40 arranged at a predetermined pitch along the X direction and facing the transmission unit 5 (see FIG. 1), a reception graduation 41 arranged at a pitch different from that of the transmission graduation 40 along the X direction and facing the reception unit 6 (see FIG. 1), and a connection unit 42 configured to connect the transmission graduation 40 and the reception graduation 41. The graduation coils 4 are constituted by linear conductors which are materials having low electrical resistance, such as aluminum, copper, and gold.

The transmission graduations 40 are arranged with a pitch L1. The reception graduations 41 are arranged with a pitch L0, which is a pitch different from that of the transmission graduation 40. In this case, the pitch L1 is set to a pitch larger than the pitch L0.

The connection unit 42 is configured to connect the transmission graduation 40 arranged along the Y direction on the upper side of the figure and the reception graduations 41 arranged on the lower side of the figure to form one graduation coil 4. The connection unit 42 is configured to connect the transmission graduation 40 and the reception graduation 41 so as to form a loop shape without a disconnected portion.

Figure 3:
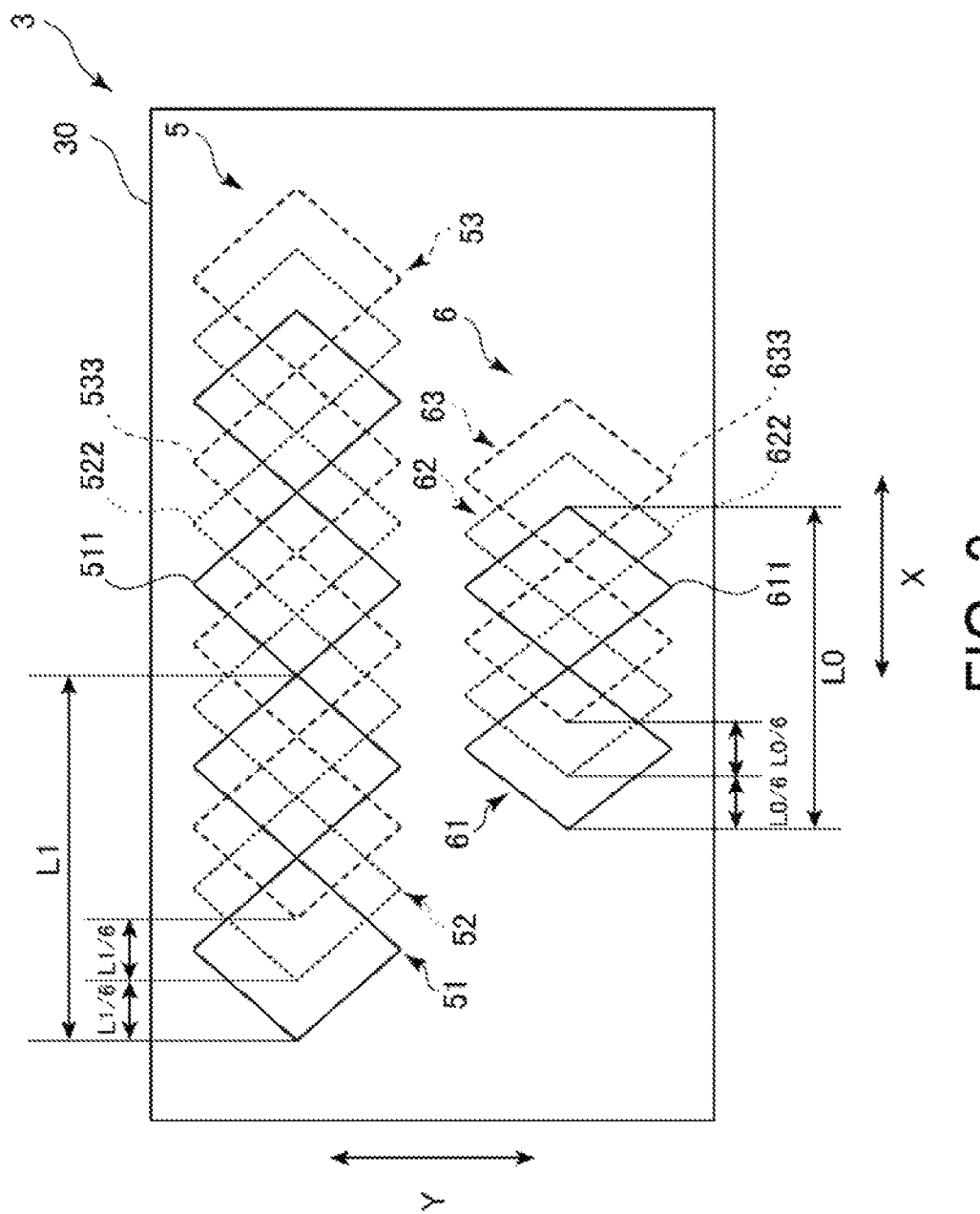
FIG. 3 is a bottom view illustrating a head of the electromagnetic induction type position detector.

FIG. 3 is a bottom view illustrating a head of the electromagnetic induction type position detector.

As illustrated in FIG. 3, the head 3 is formed by an insulating substrate 30 made of a glass epoxy resin. The insulating substrate 30 constitutes the transmission unit 5 and the reception unit 6 using a multilayer substrate formed by stacking a plurality of substrates. It should be noted that the insulating substrate 30 may be constituted by a material such as glass and silicon instead of glass epoxy resin.

The transmission unit 5 is configured to include a first transmission coil group 51, a second transmission coil group 52, and a third transmission coil group 53, which form a plurality of transmission coil groups arranged such that adjacent transmission coil groups have a predetermined phase difference along the X direction. The transmission coil groups from the first transmission coil group 51 to the third transmission coil group 53 are arranged so as to be shifted by a phase difference L1/6 of 60 degrees.

The first transmission coil group 51 is constituted by a plurality of transmission coils 511, the second transmission coil group 52 is constituted by a plurality of transmission coils 522, and the third transmission coil group 53 is constituted by a plurality of transmission coils 533. The plurality of transmission coils 511, 522, and 533 are constituted by layers of a plurality of substrates, and are formed on the insulating substrate 30.

The pluralities of transmission coils 511, 522, and 533 are arranged with the same (same size) pitch L1 as the pitch L1 of the transmission graduation 40. For this reason, the pluralities of transmission coils 511, 522, and 533 are arranged with the pitch L1 along the X direction. The pluralities of transmission coils 511, 522, and 533 are constituted by linear conductors which are materials having low electrical resistance, such as aluminum, copper, and gold.

The reception unit 6 is configured to include a first reception coil group 61, a second reception coil group 62, and a third reception coil group 63, which form a plurality of reception coil groups constituted by a plurality of reception coils 611, 622, and 633 and arranged along the X direction so as to be shifted by the same phase difference as that of the transmission coil groups from the first transmission coil group 51 to the third transmission coil group 53. That is, the reception coil groups from the first reception coil group 61 to the third reception coil group 63 are arranged so as to be shifted by a phase difference L0/6 of 60 degrees.

The first reception coil group 61 is constituted by a plurality of reception coils 611, the second reception coil group 62 is constituted by a plurality of reception coil groups 622, and the third reception coil group 63 is constituted by a plurality of reception coils 633. The pluralities of reception coils 611, 622, and 633 are constituted by layers of a plurality of substrates and are formed on the insulating substrate 30.

The pluralities of reception coils 611, 622, and 633 are arranged with the same (same size) pitch L0 as the pitch L0 of the reception graduation 41. For this reason, the pluralities of reception coils 611, 622, and 633 are arranged with the pitch L0 along the X direction. The pluralities of transmission coils 611, 622, and 633 are constituted by linear conductors which are materials having low electrical resistance, such as aluminum, copper, and gold.

Figure 4:
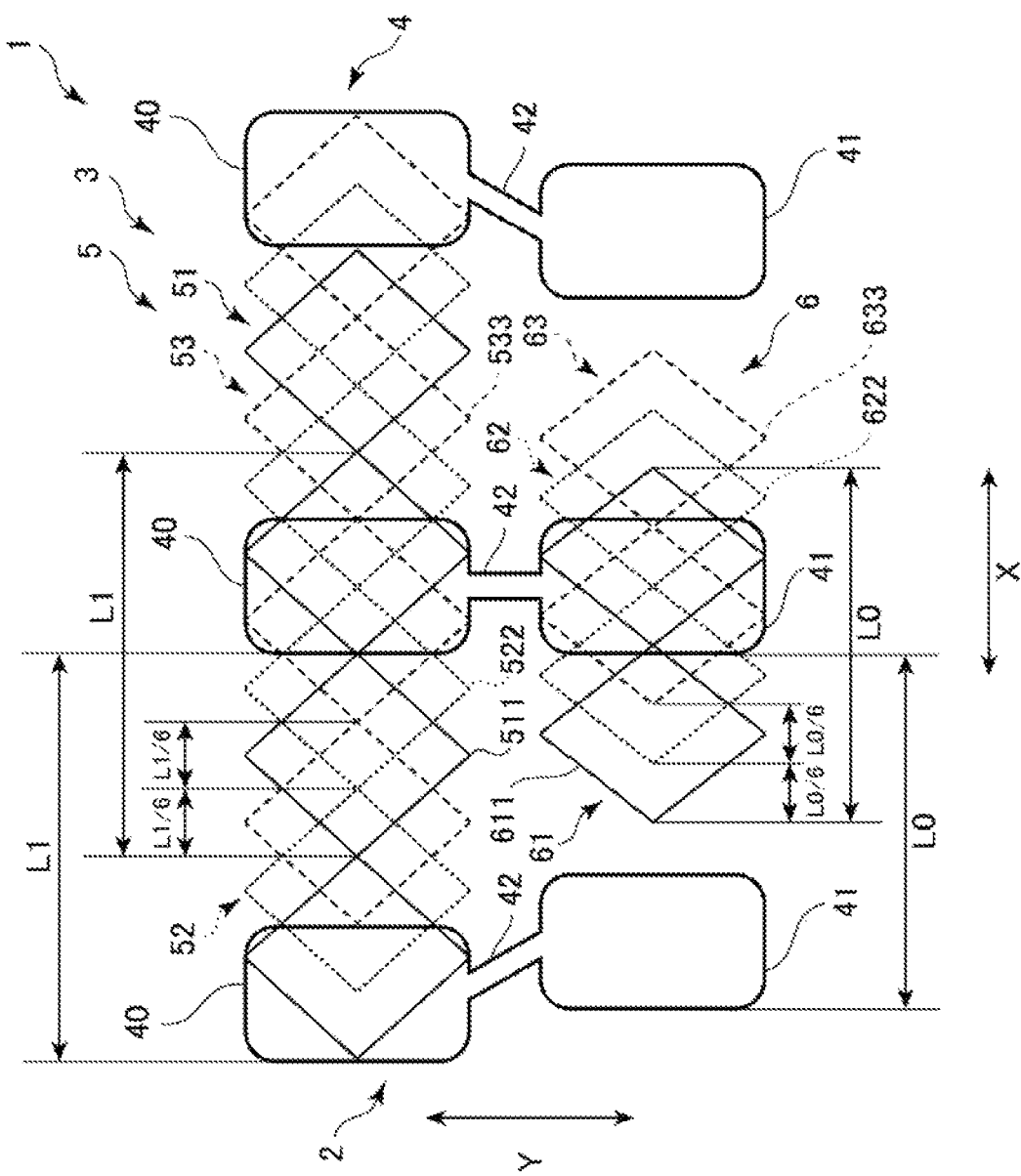
FIG. 4 is a schematic view illustrating a graduation coil, a transmission unit, and a reception unit of the electromagnetic induction type position detector.

FIG. 4 is a schematic view illustrating a graduation coil, a transmission unit, and a reception unit of the electromagnetic induction type position detector. In particular, this figure illustrates the relationship between the transmission unit 5 and the reception unit 6 with respect to the graduation coils 4.

As illustrated in FIG. 4, the transmission graduation 40 of the scale 2 is provided to face the transmission unit 5 of the head 3, and the transmission graduation 40 and the pluralities of transmission coils 511, 522, and 533 are both arranged with the pitch L1.

In addition, the reception graduation 41 of the scale 2 is provided to face the reception unit 6 of the head 3, and the reception graduation 41 and the pluralities of reception coils 611, 622, and 633 are arranged with the pitch L0.

Figure 5:
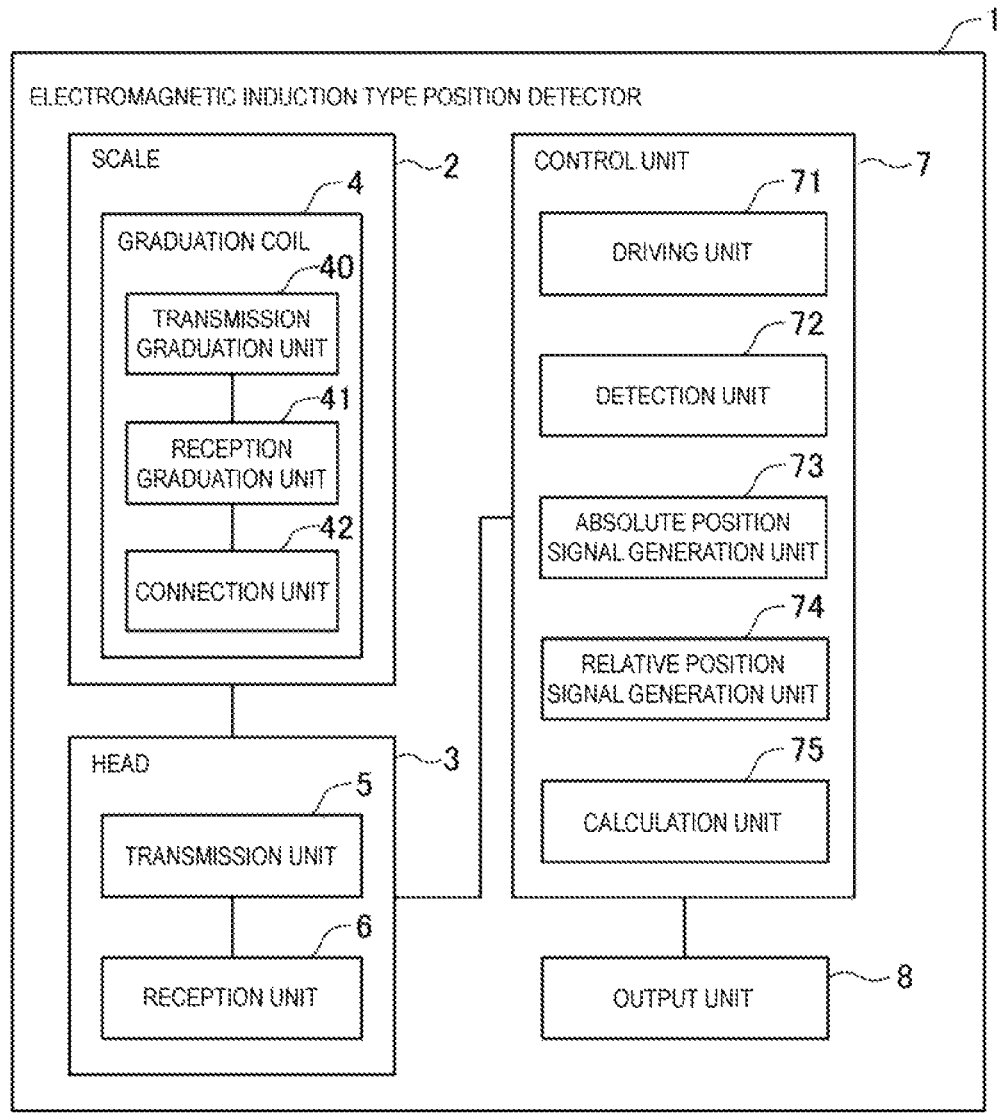
FIG. 5 is a block diagram illustrating a control unit of the electromagnetic induction type position detector.

FIG. 5 is a block diagram illustrating a control unit of the electromagnetic induction type position detector.

As illustrated in FIG. 5, the electromagnetic induction type position detector 1 further includes a control unit 7 configured to calculate, by driving the transmission unit 5, a position of the head 3 in the X direction with respect to the scale 2 from a change of signal detected by the reception unit 6 via the graduation coils 4, and an output unit 8 configured to output the position of the head 3 in the X direction with respect to the scale 2, which is calculated by the control unit 7, to outside of the electromagnetic induction type position detector 1.

The control unit 7 includes a driving unit 71 configured to independently drive the transmission coil groups from the first transmission coil group 51 to the third transmission coil group 53 in order, a detection unit 72 configured to detect a plurality of signals with the reception coil groups from the first reception coil group 61 to the third reception coil group 63 for each of the transmission coils from the first transmission coil group 51 to the third transmission coil group 53 in the order of driving, an absolute position signal generation unit 73 configured to generate an absolute position signal for calculating the absolute position of the head 3 with respect to the scale 2 based on a plurality of signals, a relative position signal generation unit 74 configured to generate a relative position signal for calculating the relative position of the head 3 with respect to the scale 2 based on a plurality of signals, and a calculation unit 75 configured to calculate the position of the head 3 in the X direction with respect to the scale 2 based on the absolute position signal and the relative position signal.

The output unit 8 is configured to output and display the position of the head 3 in the X direction with respect to the scale 2, which is calculated by the control unit 7, on a display screen of a computer connected to the electromagnetic induction type position detector 1, for example. It should be noted that the output unit 8 may not be a display screen or the like, and may be any type of unit provided that the position of the head 3 in the X direction with respect to the scale 2, which is calculated by the control unit 7, can be output.

Figure 6:
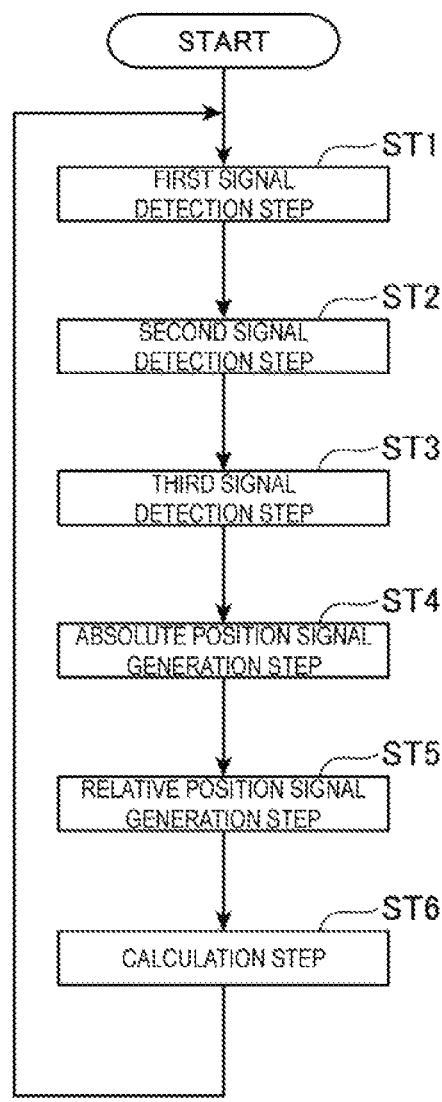
FIG. 6 is a flowchart illustrating a detection method of the electromagnetic induction type position detector.
Figure 7A:
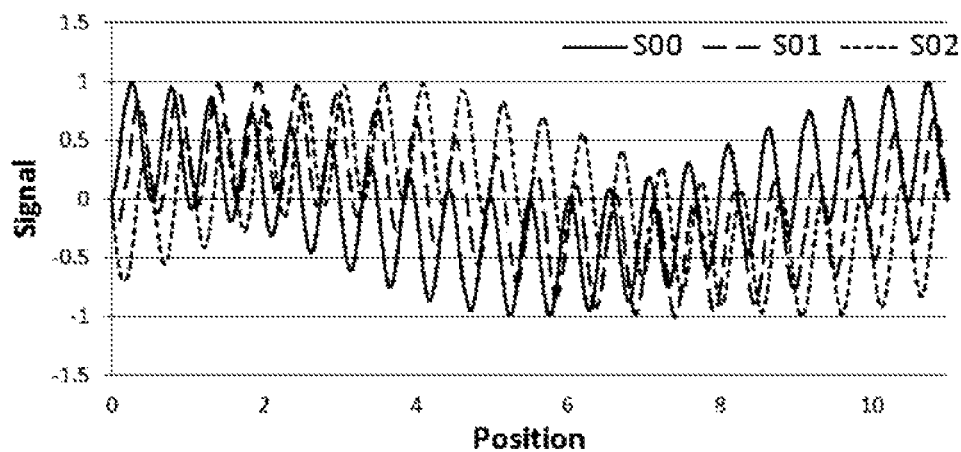
FIG. 7A to FIG. 7C are graphs illustrating signals detected by a detection unit of the electromagnetic induction type position detector.
Figure 7B:
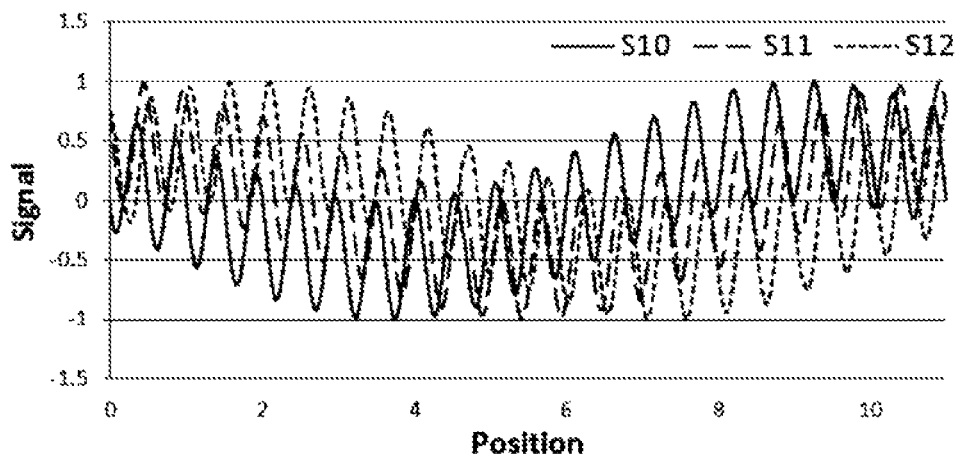
Figure 7C:
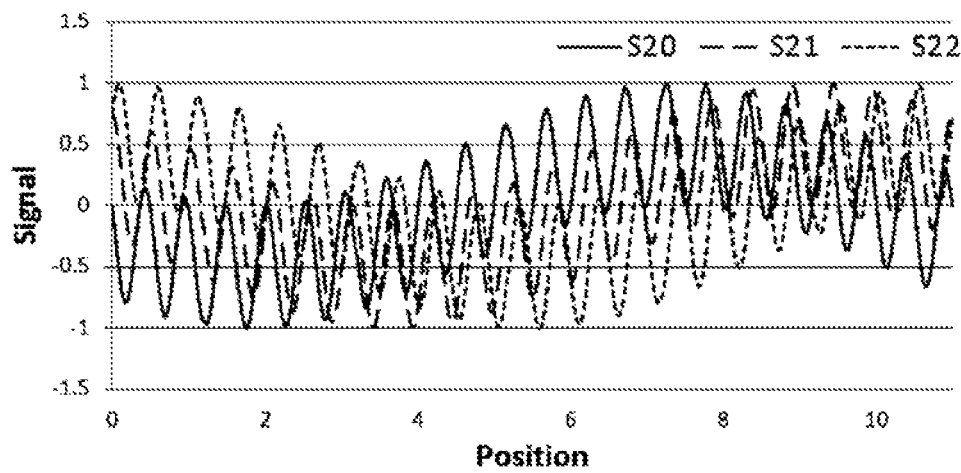
Figure 8A:
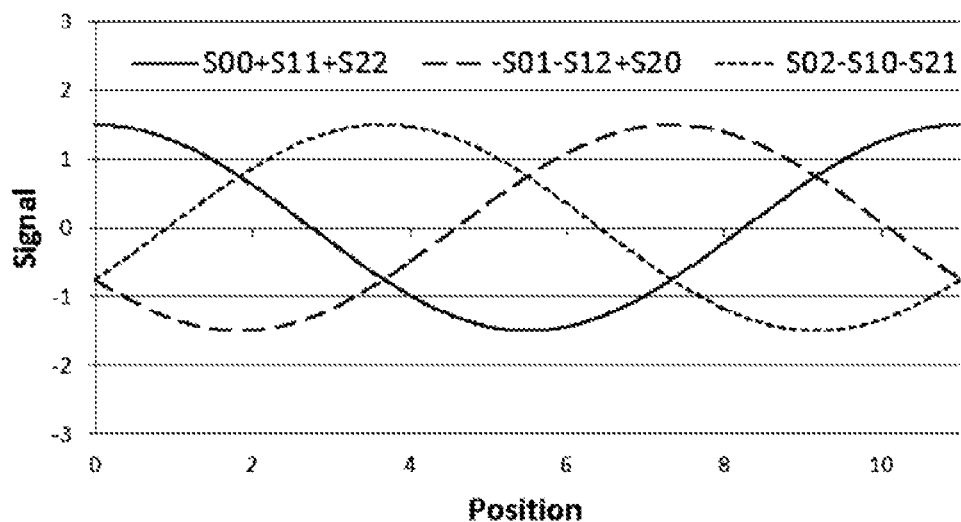
FIG. 8A to FIG. 8B are graphs illustrating a relative position signal and an absolute position signal of the electromagnetic induction type position detector.
Figure 8B:
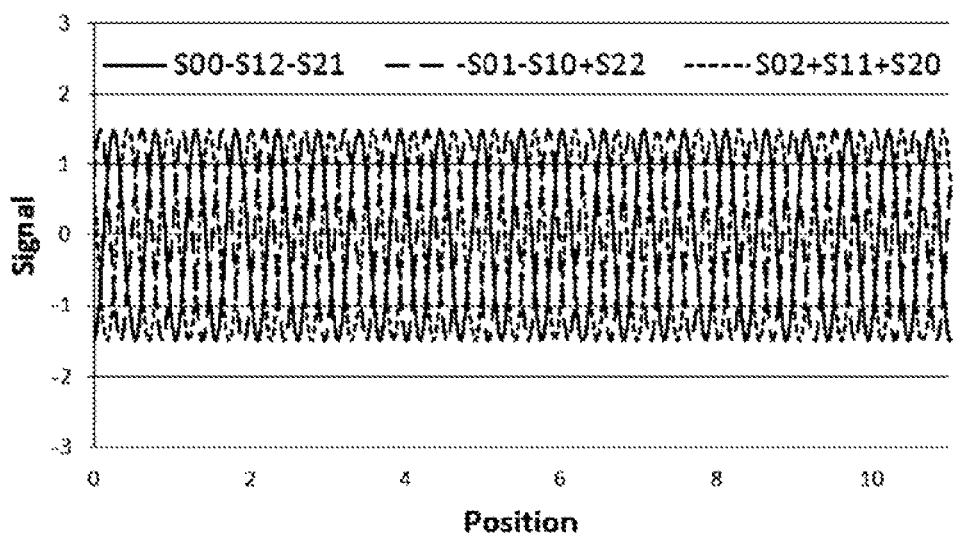

FIG. 6 is a flowchart illustrating a detection method of the electromagnetic induction type position detector. In addition, FIG. 7A to FIG. 7C are graphs illustrating signals detected by a detection unit of the electromagnetic induction type position detector, and FIG. 8A to FIG. 8B are graphs illustrating a relative position signal and an absolute position signal of the electromagnetic induction type position detector, In particular, FIG. 7A is a graph illustrating a first signal detected in a case that the first transmission coil group 51 is driven, FIG. 7B is a graph illustrating a second signal detected in a case that the second transmission coil group 52 is driven, and FIG. 7C is a graph illustrating a third signal detected in a case that the third transmission coil group 53 is driven. In addition, FIG. 8A is a graph illustrating the absolute position signal, and FIG. 8B is a graph illustrating the relative position signal.

Hereinafter, a method for calculating, by the control unit 7, the position of the head 3 in the X direction with respect to the scale 2 will be described with reference to the figures from FIG. 6 to FIG. 8A and FIG. 8B.

As illustrated in FIG. 6, first, the control unit 7 of the electromagnetic induction type position detector 1 drives the first transmission coil group 51 with the driving unit 71, and performs a first signal detection step for detecting the first signals S00, S01, and S02 with the detection unit 72 via the reception coil groups from the first reception coil group 61 to the third reception coil group 63 (Step ST1).

In particular, as illustrated in FIG. 7A, in a case that the driving unit 71 drives the first transmission coil group 51, the detection unit 72 detects the first signals S00, S01, and S02, where the signal received by the first reception coil group 61 is S00, the signal detected by the second reception coil group 62 is S01, and the signal detected by the third reception coil group 63 is S02.

Next, the control unit 7 drives the second transmission coil group 52 with the driving unit 71, and performs a second signal detection step for detecting the second signals S10, S11, and S12 with the detection unit 72 via the reception coil groups from the first reception coil group 61 to the third reception coil group 63 (Step ST2).

In particular, as illustrated in FIG. 7B, in a case that the driving unit 71 drives the second transmission coil group 52, the detection unit 72 detects the second signals S10, S11, and S12, where the signal received by the first reception coil group 61 is S10, the signal detected by the second reception coil group 62 is S11, and the signal detected by the third reception coil group 63 is S12.

Next, the control unit 7 drives the third transmission coil group 53 with the driving unit 71, and performs a third signal detection step for detecting the third signals S20, S21, and S22 with the detection unit 72 via the reception coil groups from the first reception coil group 61 to the third transmission coil group 63 (Step ST3).

In particular, as illustrated in FIG. 7C, in a case that the driving unit 71 drives the third transmission coil group 53, the detection unit 72 detects the third signals S20, S21, and S22, where the signal received by the first reception coil group 61 is S20, the signal detected by the second reception coil group 62 is S21, and the signal detected by the third transmission coil group 63 is S22.

In this way, the transmission coil groups from the first transmission coil group 51 to the third transmission coil group 53 are driven in a time division manner.

By performing Steps ST1 to ST3, the driving unit 71 and the detection unit 72 detect nine signals in total, including the first signals S00, S01, and S02, the second signals S10, S11, and S12, and the third signals S20, S21, and S22.

These nine signals are signals obtained by combining the absolute position signal of the period of Lcoa (Expression 1) and the relative position signal of the period of Lfine (Expression 2). For this reason, the control unit 7 can calculate the absolute position signal and the relative position signal by analyzing the nine detection signals with an operation.

[Math. 1]
$$Lcoa = \frac{L0 \times L1}{L1 - L0} \tag{1}$$

[Math. 2]
$$Lfine = \frac{L0 \times L1}{L1 + L0} \tag{2}$$

In a case that the driving unit 71 and the detection unit 72 perform the steps ST1 to ST3 and detect the nine signals, as illustrated in FIG. 6, the absolute position signal generation unit 73 performs an absolute position signal generation step for generating the absolute position signals from the nine signals (Step ST4).

In particular, the absolute position signal generation unit 73 performs the operations of Expressions 3 to 5 on the nine signals. As illustrated in FIG. 8A, as a result of the operations of Expressions 3 to 5, the absolute position signal generation unit 73 generates the absolute position signals SC0, SC1, and SC2, each signal being formed from three signals with a 120 degree phase difference.

$$SC0=S00+S11+S22 \tag{3}$$

$$SC1=-S01-S12+S20 \tag{4}$$

$$SC2=S02-S10-S21 \tag{5}$$

In addition, when the driving unit 71 and the detection unit 72 perform the steps ST1 to ST3 and detect the nine signals, the relative position signal generation unit 74 performs a relative position signal generation step for generating the relative position signals from the nine signals (Step ST5).

In particular, the relative position signal generation unit 74 performs the operations of Expressions 6 to 8 on the nine signals. As illustrated in FIG. 8B, as a result of the operations of Expressions 6 to 8, the relative position signal generation unit 74 generates the relative position signals SF0, SF1, and SF2, each signal being formed from three signals with a 120 degree phase difference.

$$SF0=S00-S12-S21 \tag{6}$$

$$SF1=S01-S10+S22 \tag{7}$$

$$SF2=S02+S11+S20 \tag{8}$$

In a case that the absolute position signal generation unit 73 generates the absolute position signals SC0, SC1, and SC2, and the relative position signal generation unit 74 generates the relative position signals SF0, SF1, and SF2, as illustrated in FIG. 6, the calculation unit 75 performs a calculation step for calculating the position of the head 3 in the X direction with respect to the scale 2 (Step ST6).

In particular, by performing the operation of Expression 9 on the relative position signals SF0, SF1, and SF2, the calculation unit 75 first calculates the relative position PF of the head 3 in the X direction with respect to the scale 2 in the relative position signals SF0, SF1, and SF2.

[Math. 3]
$$PF = \frac{1}{2\pi}\tan^{-1}\left(\frac{\frac{2 \times SF0 - SF1 - SF2}{3}}{\frac{SF1 - SF2}{\sqrt{3}}}\right) \tag{9}$$

Next, by performing the operation of Expression 10 on the absolute position signals SC0, SC1, and SC2, the calculation unit 75 calculates the absolute position PC of the head 3 in the X direction with respect to the scale 2 in the absolute position signals SC0, SC1, and SC2.

[Math. 4]
$$PC = \frac{1}{2\pi}\tan^{-1}\left(\frac{\frac{2 \times SC0 - SC1 - SC2}{3}}{\frac{SC1 - SC2}{\sqrt{3}}}\right) \tag{10}$$

After calculating the relative position PF and the absolute position PC, the calculation unit 75 compares the absolute position PF with the relative position PC, and calculates the position Pos of the head 3 in the X direction with respect to the scale 2. In particular, the calculation unit 75 first calculates the number of phase N by performing the operation of Expression 11 in order to identify a phase to which the absolute position PC corresponds among the plurality of phases included in the relative position PF. It should be noted that N is an integer.

[Math. 5]
$$N = PC\frac{L1 + L0}{L1 - L0} - PF \tag{11}$$

Next, after the number of phase N is calculated, the phase number N is compared with the relative position PF, and the phase PABS of the of the absolute position PC in the relative position PF is calculated by the operation of Expression 12 to determine what phase number the absolute PC is within the relative position PF.

$$PABS=PF+N \tag{12}$$

The position Pos of the head 3 in the X direction with respect to the scale 2 can be calculated by multiplying Lfine with the phase PABS of the absolute position PC in the relative position PF as depicted in Expression 13.

$$Pos=Lfine \times PABS \tag{13}$$

As illustrated in FIG. 6, after the calculation unit 75 performs the calculation step (Step ST5), the control unit 7 returns to the first signal detection step (Step ST1), and calculates the position of the head 3 in the X direction with respect to the scale 2.

Here, the relative position signal of the period of Lfine (Expression 2), generated by the relative position signal generation unit 74, has a relationship, expressed by Expression 14, to the pitch L1 of the pluralities of transmission coils S11, S22, and S33, and has a relationship, expressed by Expression 15, to the pitch L0 of the pluralities of reception coils 611, 622, and 633.

$$Lfine < L1 \quad (14)$$

$$Lfine < L1 \quad (15)$$

Then, the numerator and the denominator of Expression 2 are divided by the pitch L0 of the pluralities of reception coils 611, 622, and 633 to obtain Expression 16.

[Math. 6]

$$Lfine = \frac{L1}{\left(1 + \frac{L1}{L0}\right)} \quad (16)$$

According to Expression 16, in a case that the pitch L1 of the pluralities of transmission coils 511, 522, and 533 and the pitch L0 of the pluralities of reception coils 611, 622, and 633 are positive numerical values, the relative position signal of the period of Lfine (Expression 2) becomes a relative position signal having a period smaller than the pitch L1 of the pluralities of transmission coils 511, 522, and 533.

Likewise, for the pitch L0 of the pluralities of reception coils 611, 622, and 633, the numerator and the denominator of Expression 2 are divided by the pitch L1 of the pluralities of transmission coils 511, 522, and 533. In a case that the pitch L1 of the pluralities of transmission coils 511, 522, and 533 and the pitch L0 of the pluralities of reception coils 611, 622, and 633 are positive numerical values, the relative position signal of the period of Lfine (Expression 2) becomes a relative position signal having a period smaller than the pitch L0 of the pluralities of reception coils 611, 622, and 633.

Accordingly, by performing predetermined operations on the nine signals, the relative position signal generation unit 74 can generate the relative position signal having a period smaller than the pitch L1 of the pluralities of transmission coils 511, 522, and 533 and the pitch L0 of the pluralities of reception coils 611, 622, and 633. In this way, the electromagnetic induction type position detector 1 can detect a high resolution relative position signal.

According to this embodiment, the following effects can be achieved.

(1) The absolute position signal generation unit 73 can generate the absolute position signal by performing a predetermined operation on the nine signals.

(2) The relative position signal generation unit 74 can generate the relative position signal by performing a predetermined operation on the nine signals.

(3) The relative position signal generation unit 74 can generate, by performing predetermined operations on the nine signals, the relative position signal having a period smaller than the pitch L1 of the pluralities of transmission coils 511, 522, and 533 and the pitch L0 of the pluralities of reception coils 611, 622, and 633.

(4) Since the electromagnetic induction type position detector 1 can detect the absolute position signal and detect the high resolution relative position signal without configuring the pitch of the graduation coils 4, the plurality of transmission coils 511, 522, and 533, and the plurality of reception coils 611, 622, and 633 to be smaller, it is possible to mitigate design rule restrictions, detect an absolute position signal, and cause the resolution of the position of the head 3, in a predetermined direction with respect to the scale 2, to he higher.

(5) Since the pluralities of transmission coils 511, 522, and 533 are arranged with a pitch L1 identical to the pitch L1 of the transmission graduation 40 and the pluralities of reception coils 611, 622, and 633 are arranged with a pitch L0 identical to the pitch L0 of the reception graduation 41, it is possible to prevent the occurrence of graduation coils with reduced detection efficiencies due to signal cancellation. Accordingly, in comparison with a case, for example, that the transmission coils are arranged with a pitch three times the pitch of the transmission graduation and the reception coils are arranged with a pitch three times the pitch of the reception graduation, the electromagnetic induction type position detector 1 can prevent a decrease in detection efficiency.

Second Embodiment

A second embodiment of the invention will be described hereinafter based on the drawings. Note that in the following descriptions, parts that have already been described will be given the same reference signs, and descriptions thereof will be omitted.

Figure 9:
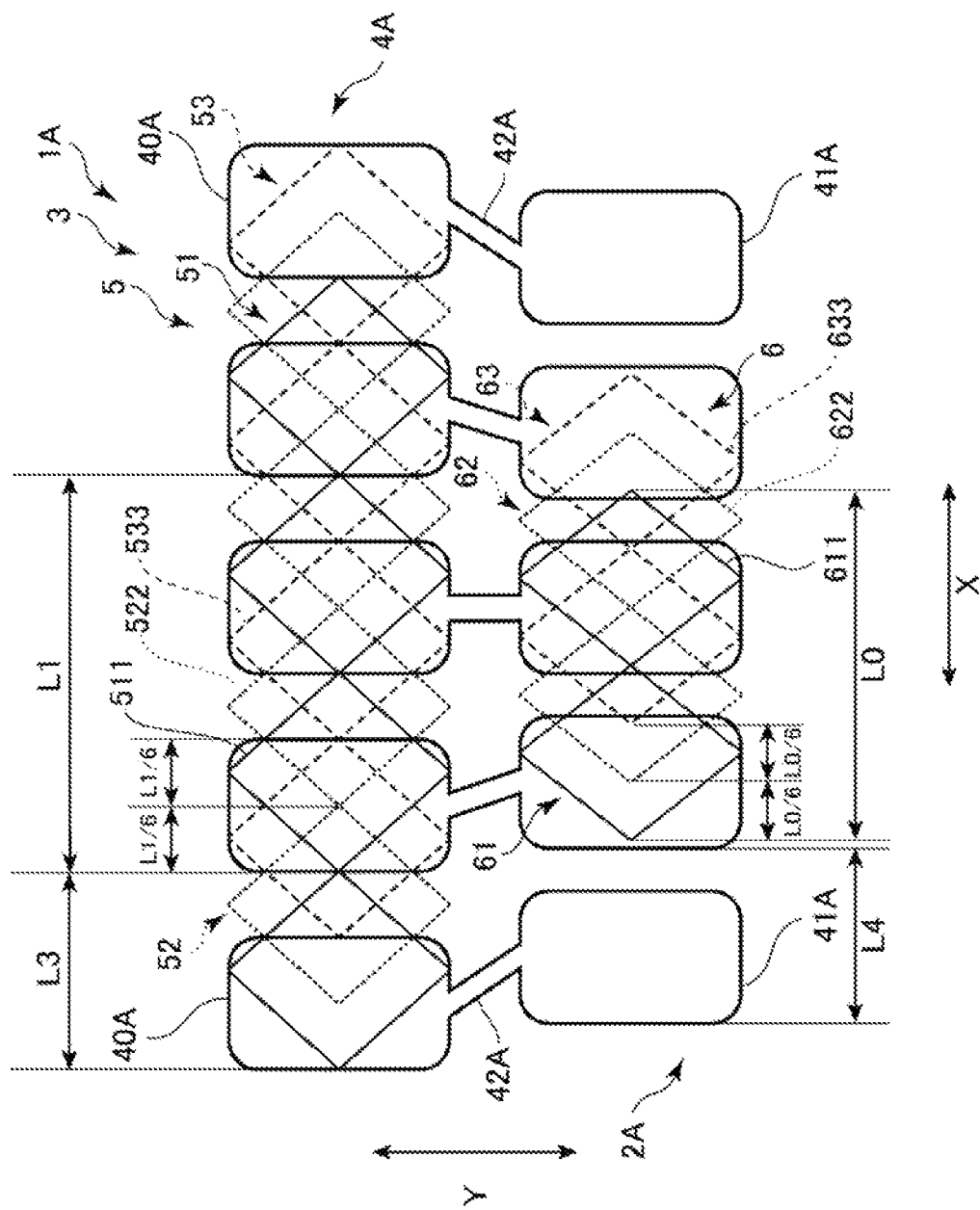
FIG. 9 is a schematic view illustrating a graduation coil, a transmission unit, and a reception unit of an electromagnetic induction type position detector according to a second embodiment of the invention.

FIG. 9 is a schematic view illustrating a graduation coil, a transmission unit, and a reception unit of an electromagnetic induction type position detector according to a second embodiment of the invention.

The scale 2A of the electromagnetic induction type position detector 1A of the present embodiment has substantially the same configuration as the scale 2 of the first embodiment with the exception of the graduation coil 4A.

As illustrated in FIG. 4, the graduation coil 4 of the first embodiment includes a transmission graduation 40 arranged with a pitch L1, a reception graduation 41 arranged with a pitch L0, and a connection unit 42 that connects the transmission graduation 40 and the reception graduation 41.

As illustrated in FIG. 9, the graduation coil 4A of the present embodiment differs from the graduation coil of the first embodiment in that it includes a transmission graduation 40A arranged with a pitch L3, which is a pitch that is half of pitch L1 (L1/2), a reception graduation 41A arranged with a pitch L4, which is a pitch that is half of pitch L0 (L0/2), and a connection unit 42A that connects the transmission graduation 40A and the reception graduation 41A. That is, the present embodiment differs from the first embodiment in that the pluralities of transmission coils 511, 522, and 533 are arranged along the X direction with a pitch L1 that is twice the pitch L3 of the transmission graduation 40A and the pluralities of reception coils 611, 622, and 633 are arranged along the X direction with a pitch L0 that is twice the pitch L4 of the reception graduation 41A.

Since the transmission graduations 40A are arranged with the pitch L3 and the reception graduations 41A are arranged with the pitch L4, a plurality of graduation coils 4A that is twice the number of the plurality of graduation coils 4 arranged on the scale 2 of the first embodiment are arranged on the scale 2A.

By increasing the number of graduation coils 4A arranged on the scale 2A, the electromagnetic induction type position detector 1A can increase the signal intensity by approximately double in comparison with the electromagnetic induction type position detector 1 of the first embodiment.

In the present embodiment as well, in addition to the effects of (1) to (4) described in the first embodiment, the following effects can be achieved.

(6) Since the pluralities of transmission coils 511, 522, and 533 are arranged with the pitch L1 that is twice the pitch L3 of the transmission graduation 40A, and the pluralities of reception coils 611, 622, and 633 are arranged with the pitch L0 that is twice the pitch L4 of the reception graduation 41A, double the graduation coils 4A are arranged to face the pluralities of transmission coils 511, 522, and 533 and the pluralities of reception coils 611, 622, and 633 in comparison with a case where the pluralities of transmission coils 511, 522, and 533 are arranged with the same pitch as the transmission graduation 40A, and the pluralities of reception coils 611, 622, and 633 are arranged with the same pitch as the reception graduation 41A. Accordingly, in comparison with the electromagnetic induction type position detector 1 of the first embodiment, since a signal having an approximately two times larger intensity can be detected, the electromagnetic induction type position detector 1A can efficiently detect a signal.

Variations on Embodiments

Note that the invention is not limited to the foregoing embodiments, and variations, improvements, and the like that fall within a scope in which the object of the invention can be achieved are also included within the invention.

For example, although the electromagnetic induction type position detectors 1 and 1A are used in the electromagnetic induction type linear encoder in the above embodiments, the electromagnetic induction type position detectors 1 and 1A may also be used in an electromagnetic induction type rotary encoder. In addition, the electromagnetic induction type position detectors 1 and 1A may be used as measurement devices such as dial gauges (test indicators) and micrometers. That is, the electromagnetic induction type position detector is not particularly limited with respect to the type and method of the measurement devices in which it may be used, and can be used in other measurement devices or the like. There is no particular limitation as to where the electromagnetic induction type position detector of the invention is implemented.

In addition, the electromagnetic induction type position detector may be used for a device other than a measurement device, such as a sensor.

In the first embodiment, the pluralities of transmission coils 511, 522, and 533 are arranged with a pitch L1 identical to the pitch L1 of the transmission graduations 40, and the pluralities of reception coils 611, 622, and 633 are arranged with a pitch L0 identical to the pitch L0 of the reception graduations 41. In addition, in the second embodiment, the pluralities of transmission coils 511, 522, and 533 are arranged with a pitch L1 that is twice the pitch L3 of the transmission graduations 40A, and the pluralities of reception coils 611, 622, and 633 are arranged with a pitch L0 that is twice the pitch L4 of the reception graduations 41A. However, the pluralities of transmission coils may be arranged with a pitch that is three times or four times the pitch of the transmission graduations, and the pluralities of reception coils may be arranged with a pitch that is three or four times the pitch of the reception graduations. To put it differently, the pluralities of transmission coils may be arranged with a pitch that is an integral multiple of the pitch of the transmission graduations, and the pluralities of reception coils may be arranged with a pitch that is an integral multiple of the pitch of the reception graduations.

In the above embodiments, although the transmission coil groups from the first transmission coil group 51 to the third transmission coil group 53 of the transmission unit 5 are arranged so as to be shifted by a phase difference L1/6 of 60 degrees and the reception coil groups from the first reception coil group 61 to the third reception coil group 63 of the reception unit 6 are arranged so as to be shifted by a phase difference L1/6 of 60 degrees, they may be arranged with a phase difference of 120 degrees instead of a phase difference of 60 degrees. That is, the transmission unit may include a plurality of transmission coil groups that are arranged such that adjacent transmission coil groups have a predetermined phase difference along a predetermined direction, and the reception unit may include a plurality of reception coil groups that are arranged such that adjacent reception coil groups have a phase difference identical to the predetermined phase difference of the plurality of transmission coil groups along the predetermined direction.

In addition, although the transmission unit 5 includes three transmission coil groups 51 to 53, it may include two transmission coil groups, or may include four transmission coil groups. In addition, although the reception unit 6 includes three reception coil groups 61 to 63, it may include two reception coil groups, or may include four reception coil groups. That is, the transmission unit may include a plurality of transmission coil groups that are arranged such that adjacent transmission coil groups have a predetermined phase difference, and a plurality of transmission coils, arranged with a predetermined pitch, that constitute each of the plurality of transmission coil groups, and the reception unit may include a plurality of reception coil groups that are arranged such that adjacent reception coil groups have a phase difference identical to the predetermined phase difference of the plurality of transmission coil groups, and a plurality of reception coils, arranged with a pitch different from the predetermined pitch of the plurality of transmission coils, that constitute each of the plurality of reception coil groups.

In the first embodiment, although the transmission graduations 40 are arranged with the pitch L1, the reception graduations 41 are arranged with the pitch L0, and the pitch L1 is set to be a pitch larger than the pitch L0, the pitch L1 may be set to be a pitch smaller than the pitch L0. That is, the transmission graduations may be arranged with a predetermined pitch along a predetermined direction, and the reception graduations may be arranged along the predetermined direction with a pitch different to that of the transmission graduations.

In the above embodiments, although the control unit 7 is configured to calculate the position of the head 3 in the X direction with respect to the scale 2 by the operations of Expressions 1 to 13, provided that the control unit 7 can calculate the position of the detector in the predetermined direction with respect to the graduation substrate based on the absolute position signal and the relative position signal, any operation may be used to calculate the position of the detector in the predetermined direction with respect to the graduation substrate.

INDUSTRIAL APPLICABILITY

As described above, the invention can he suitably used as an electromagnetic induction type position detector.

REFERENCE SIGNS LIST 1, 1A, Electromagnetic induction type position detector
2, 2A Scale
3 Head
4 Graduation coil
5 Transmission unit
6 Reception unit 7 Control unit
40, 40A Transmission graduation
41, 41A Reception graduation
42, 42A Connection unit
51 to 53 Transmission coil group
61 to 63 Reception coil group
71 Driving unit
72 Detection unit
73 Absolute position signal generation unit
74 Relative position signal generation unit
75 Calculation unit

The invention claimed is:

1. An electromagnetic induction type position detector comprising:
a graduation substrate having a plate shape and includes a plurality of graduation coils arranged along a predetermined direction;
a detector including a transmission unit and a reception unit that are provided to face the plurality of graduation coils; and
a control unit configured to calculate, by driving the transmission unit, a position of the detector in the predetermined direction with respect to the graduation substrate based on a change of a signal to be detected by the reception unit via the plurality of graduation coils;
wherein each of the plurality of graduation coils includes:
a transmission graduation, arranged with a pitch that is predetermined along the predetermined direction, that faces the transmission unit,
a reception graduation, arranged with a pitch different from the pitch of the transmission graduation along the predetermined direction, that faces the reception unit, and
a connection unit for connecting the transmission graduation and the reception graduation;
the transmission unit includes:
a plurality of transmission coil groups arranged along the predetermined direction such that adjacent transmission coil groups have a phase difference that is predetermined, and
a plurality of transmission coils, arranged with a pitch which is an integral multiple of the pitch of the transmission graduation along the predetermined direction, that constitute each of the plurality of transmission coil groups;
the reception unit includes:
a plurality of reception coil groups arranged along the predetermined direction such that adjacent reception coil groups have a phase difference identical to the phase difference of the plurality of transmission coil groups, and
a plurality of reception coils, arranged with a pitch which is an integral multiple of the pitch of the reception graduation along the predetermined direction, that constitute each of the plurality of reception coil groups; and
the control unit is configured to:
independently drive the plurality of transmission coil groups in order, and generate, based on a plurality of signals detected by the plurality of reception coil groups, each detecting a signal for each of the plurality of transmission coil groups in an order of driving the plurality of transmission coil groups, an absolute position signal to calculate an absolute position of the detector with respect to the graduation substrate and a relative position signal to calculate a relative position of the detector with respect to the graduation substrate, and
calculate, based on the absolute position signal and the relative position signal, a position of the detector in the predetermined direction with respect to the graduation substrate.

2. The electromagnetic induction type position detector according to claim 1, wherein:
the plurality of transmission coils are arranged along the predetermined direction with a pitch identical to the pitch of the transmission graduation; and
the plurality of reception coils are arranged along the predetermined direction with a pitch identical to the pitch of the reception graduation.

3. The electromagnetic induction type position detector according to claim 1, wherein:
the plurality of transmission coils are arranged along the predetermined direction with a pitch that is twice the pitch of the transmission graduation; and
the plurality of reception coils are arranged along the predetermined direction with a pitch that is twice the pitch of the reception graduation.

4. The electromagnetic induction type position detector according to claim 1, wherein the control unit includes:
a driving unit configured to independently drive the plurality of transmission coil groups in order;
a detector configured to detect a plurality of signals with the plurality of reception coil groups, each detecting a signal for each of the plurality of transmission coil groups in the order of driving the plurality of transmission coil groups;
an absolute position signal generation unit configured to generate the absolute position signal to calculate, based on the plurality of signals, the absolute position of the detector with respect to the graduation substrate;
a relative position signal generation unit configured to generate the relative position signal to calculate, based on the plurality of signals, the relative position of the detector with respect to the graduation substrate; and
a calculation unit configured to calculate, based on the absolute position signal and the relative position signal, the position of the detector in the predetermined direction with respect to the graduation substrate.

5. An electromagnetic induction type encoder provided with the electromagnetic induction type position detector according to claim 1, the electromagnetic induction type encoder comprising:
a scale that is plate-shaped and includes the plurality of graduation coils arranged along a predetermined direction; and
a head including the transmission unit and the reception unit that are provided to face the plurality of graduation coils,
wherein the control unit is configured to calculate, based on the absolute position signal and the relative position signal, a position of the head in the predetermined direction with respect to the scale.

* * * * *